United States Patent [19]

Kaiya et al.

[11] 3,952,023

[45] Apr. 20, 1976

[54] METHOD FOR PREPARING ADDUCT OF BUTADIENE POLYMER OR COPOLYMER AND α, β-ETHYLENICALLY UNSATURATED DICARBOXYLIC ACID COMPOUND

[75] Inventors: Atsushi Kaiya, Kawasaki; Yutaka Otsuki; Hideo Horii, both of Yokohama, all of Japan

[73] Assignee: Nippon Oil Company Ltd., Tokyo, Japan

[22] Filed: Dec. 12, 1973

[21] Appl. No.: 423,985

[30] Foreign Application Priority Data

| Dec. 16, 1972 | Japan | 47-126461 |
| May 25, 1973 | Japan | 48-57676 |
| Dec. 7, 1973 | Japan | 48-137079 |
| Dec. 7, 1973 | Japan | 48-137080 |
| Dec. 7, 1973 | Japan | 48-137081 |

[52] U.S. Cl. ............... 260/346.8 R; 260/485 R; 260/537 N; 526/19
[51] Int. Cl.² .......................................... C07D 307/60
[58] Field of Search ........... 260/346.8, 45.8, 45.9, 260/45.95, 78.4, 485, 537

[56] References Cited

UNITED STATES PATENTS

| 2,035,250 | 3/1936 | Thomas | 260/45.95 E |
| 2,676,947 | 4/1954 | Parker | 260/45.95 R |
| 2,698,312 | 12/1954 | Parker | 260/45.95 R |
| 2,798,860 | 7/1957 | Hand | 260/45.9 QB |
| 2,867,604 | 1/1959 | Rosenwald et al. | 260/45.9 QB |
| 2,894,921 | 7/1959 | Jones | 260/45.8 NW |
| 3,296,189 | 1/1967 | Eastman | 260/45.8 NW |
| 3,766,215 | 10/1973 | Hesse et al. | 260/346.8 R |

*Primary Examiner*—Harry I. Moatz
*Attorney, Agent, or Firm*—Flynn & Frishauf

[57] ABSTRACT

In a method for preparing an adduct of (A) a butadiene lower polymer or butadiene lower copolymer and (B) a α,β-ethylenically unsaturated dicarboxylic acid compound, said method is characterized in that said (A) and (B) are caused to react in the presence of one or more compounds selected from (C) p-phenylenediamine derivatives, catechol derivatives, pyrogallol derivatives, N-nitrosamines, quinoline derivatives and naphthol derivatives, thus serious increase of the viscosity of said adduct in the addition reaction can be prevented.

6 Claims, No Drawings

METHOD FOR PREPARING ADDUCT OF BUTADIENE POLYMER OR COPOLYMER AND α, β-ETHYLENICALLY UNSATURATED DICARBOXYLIC ACID COMPOUND

BACKGROUND OF THE INVENTION

This invention relates to a method for preparing an adduct of a butadiene lower polymer or butadiene lower copolymer and a α,β-ethylenically unsaturated dicarboxylic acid compound.

In the field of the electrodeposition of a water paint, a butadiene lower polymer has been widely accepted as a film forming material. This fact depends upon that the coating film formed from butadiene lower polymer or copolymer has excellent film properties in view of the chemical resistance, solvent resistance, weather resistance, leveling property and so forth as compared with those prepared from the conventional film forming materials such as drying oils and alkyd resins.

In order to prepare film forming materials for water paints, it is necessary to introduce hydrophilic groups such as carboxyl, hydroxyl, ether, amino and sulfonic acid groups into the molecular structure of the material. As a method for introducing a carboxyl group as the hydrophilic group into drying oils having conjugated double bonds such as tung oil, dehydrated castor oil and isomerized drying oil, or into those having non-conjugated double bonds such as linseed oil and soybean oil, maleic anhydride is usually added to said drying oils, which are neutralized thereafter, where thus prepared modified oils are widely employed as maleic oils.

While, with regard to the introduction of the carboxyl group to the butadiene lower polymer or copolymer, it is also well known that an adduct can be prepared by heating it with a α,β-ethylenically unsaturated dicarboxylic acid compound, as disclosed in Japanese Patent Publication No. 954, of 1971.

However, during the preparation of the adduct of a butadiene lower polymer or copolymer with a α,β-ethylenically unsaturated dicarboxylic acid compound, the viscosity of the reaction product is largely increased as compared with that of the starting polymer, and gelatin of the product is sometimes caused. Further, when the viscosity of the adduct is excessively high, the treatment of water-solubilizing becomes very difficult.

Accordingly, several attempts have been studied and tried in order to reduce the viscosity of the adduct in the conventional process of the reaction between a α,β-ethylenically unsaturated dicarboxylic acid compound and a butadiene lower polymer or copolymer. For example, use of a non-coloring stabilizer (French Patent No. 1,332,596), copper and copper compounds (Japanese patent Publications, No. 26,870 of 1968 and No. 44,557 of 1972), and alkyl amines, ammonium salts, urethane compounds and urea compounds (Japanese Patent Publications, No. 3,544 of 1973, No. 3,545 of 1973, No. 3,546 of 1973 and No. 3,547 of 1973) are well known as gelation inhibitors of the reaction materials.

Nevertheless, when non-coloring stabilizers such as hydroquinone, tert-amylhydroquinone, diphenylamine and 2,6-di-tert-butyl-4-methylphenol as disclosed in French Patent No. 1,332,596 are used, only a small addition of them causes an undesirable effect on the air drying property of some butadiene lower polymers, or at least, delays the drying, and furthermore, the effect of decreasing the viscosity of a adduct is very small or almost zero.

Further, when the copper or copper compounds as disclosed in Japanese Patent Publication Nos. 26,870 of 1968 and 44,557 of 1972 are used, a dark-colored adduct is obtained, the rate of addition reaction is low, and the viscosity of the adduct does not decrease so much.

Still further, when the alkyl amines such as diethylamine and triethylamine as disclosed in Japanese Patent Publication Nos. 3,544; 3,545; 3,546 and 3,547 of 1973 are used, the adduct is greatly colored and the addition is caused only to a small extent at a higher temperature of about 200°C, while a by-product is produced owing to the reaction between maleic anhydride and said alkyl amines.

BRIEF SUMMARY OF THE INVENTION

In view of the above-mentioned facts, the inventors of the present application have made extensive studies on a method for preparing a usable and low viscosity adduct of a butadiene lower polymer and a lower copolymer with α,β-ethylenically unsaturated dicarboxylic acid compounds. As a result, it has been found that, when the above addition reaction is carried out in the presence of one member or more of the compounds selected from p-phenylenediamine derivatives, catechol derivatives, pyrogallol derivatives, N-nitrosamines, quinoline derivatives and naphthol derivatives, the gelation of the reaction materials can be completely prevented without causing any ill effect to the addition reaction, and further that the resulting adduct has a far lower viscosity and desirable color as compared with those of an adduct obtained by using the aforementioned conventional additives. Thus the present invention has been accomplished.

More particularly, in the method of the present invention, an adduct of (A) a butadiene lower polymer or a lower copolymer and (B) a α,β-ethylenically unsaturated dicarboxylic acid compound, is prepared, in which said (A) and (B) are heated generally at a temperature of 120° to 250°C, preferably 150° to 220°C, in the presence of (C) one or more compounds selected from p-phenylenediamine derivatives, catechol derivatives, pyrogallol derivatives, N-nitrosamines, quinoline derivatives and naphthol derivatives generally in an amount of 0.005 to 5% by weight to said material (A).

Further, the present invention is characterized in that said one or more compounds selected from p-phenylenediamine derivatives, cathechol derivatives, pyrogallol derivatives, N-nitrosamines, quinoline derivatives and naphthol derivatives are used as the gelation inhibitor, so that the viscosity of the adduct of said (A) a butadiene lower polymer or a lower copolymer and (B) a α,β-ethylenically unsaturated dicarboxylic acid compound can be markedly decreased and the color of said adduct is very light. The viscosity of the adduct of said materials (A) and (B) depends upon the amount of carboxyl group introduced and the molecular weight of said (A) butadiene lower polymer or copolymer as used. According to the method of the present invention, however, the carboxyl group can be easily introduced into a butadiene polymer or copolymer of even higher molecular weight.

DETAILED DESCRIPTION OF THE INVENTION

The butadiene lower polymers used in the present invention are butadiene polymers rich in a 1,2-double bond, those rich in a 1,4-double bond and those containing both 1,2- and 1,4-double bonds. That is, the butadiene polymers which are prepared by polymerizing butadiene solely or with other monomers in the presence of a catalyst of an alkali metal or an organic alkali metal compound, are typical ones. In order to regulate the molecular weight, to reduce the gel content and to form a light-colored polymer, a living polymerization is carried out in a tetrahydrofuran medium, and a chain transfer polymerization method in which ethers such as dioxane and alcohols such as isopropyl alcohol are added and aromatic hydrocarbons such as toluene and xylene are used as the chain transfer agent or the solvent, are typically exemplified. The lower polymer in which most of the double bonds in butadiene units are 1,2-double bonds, can be prepared through the above methods, and this lower polymer can be used in the present invention. The butadiene lower polymer in which most of the double bonds in butadiene units are 1,4-double bonds can be prepared by polymerizing butadiene solely or with another monomer in the presence of a catalyst comprising a compound of a metal of the group VIII of the periodic table and an alkyl aluminum halogenide, and said butadiene lower polymer may also be used in the present invention.

The lower copolymer as referred to in the present invention means the copolymers of butadiene with conjugated diolefins other than butadiene such as isoprene, 2,3-dimethyl butadiene and piperylene or with vinyl-substituted aromatic compounds such as α-methyl styrene, vinyltoluene and divinylbenzene as the co-monomers. While, butadiene lower copolymers containing less than 50% by weight of said co-monomers may be preferably used.

Further, in the present invention, the modified products of the butadiene lower polymers or copolymers which are prepared by heating and partially oxidizing the butadiene lower polymers or copolymers with blowing of air in the presence of a drying agent of a carboxylic acid metallic salt such as cobalt naphthenate or manganese octenoate, or prepared by thermal treatment in the presence of an organic perioxide, may also be used.

The butadiene lower polymer or copolymer in the present invention is liquid or semi-solid at room temperature, and the number average molecular weight thereof is in the range of 200 to 10,000.

Said α,β-ethylenically unsaturated dicarboxylic acid compounds in the present invention may be represented by the following general formula:

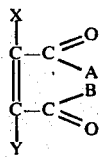

in which X and Y are hydrogen atoms or alkyl groups, and may be the same or different; and A and B are hydroxyl groups, alkoxyl groups or an —O— bond formed by linking A and B together. Said α,β-ethylenically unsaturated dicarboxylic acid compounds include anhydrides of maleic acid such as maleic anhydride, citraconic anhydride and 1,2-diethylmaleic anhydride, and esters of maleic acid such as monomethylmaleic acid, dimethylmaleic acid and diethylmaleic acid, and those having 12 or less carbon atoms in each molecule may be advantageously used.

The amount of α,β-ethylenically unsaturated dicarboxylic acid compound as used in the present invention is not especially restricted, however, when the adduct is used as the water-soluble or water-dispersible film forming material, the rate of addition calculated from the acid value and saponification value may not be more than 50% by weight, and 3 to 25% by weight is preferable. In general, the higher the rate of addition is, the larger the viscosity becomes. In addition to that, the water-solubility of the adduct increases and, as a result, the water resistance of the water paint film decreases. On the contrary, when the rate of addition is too low, the hydrophilic property of the adduct decreases, and the water-solubility or water-dispersibility of the adduct is also lowered.

In case an acid anhydride such as maleic anhydride is used as the α,β-ethylenically unsaturated dicarboxylic acid compound of the invention, the acid anhydride rings are opened after the addition reaction by solvolysis using preferably water or an alcohol.

In the addition reaction of a butadiene lower polymer or copolymer, and a α,β-ethylenically unsaturated dicarboxylic acid compound of the present invention, one or more compounds selected from (1) p-phenylenediamine derivatives, (2) catechol derivatives, (3) pyrogallol derivatives, (4) quinoline derivatives, (5) N-nitrosamines and (6) naphthol derivatives are used.

The above-mentioned p-phenylenediamine derivatives are represented by the following general formula:

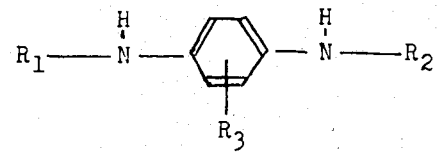

in which $R_1$ and $R_2$ are the same or different saturated hydrocarbon groups each having 1 to 20 carbon atoms, or monocyclic and polycyclic aromatic hydrocarbon groups, and $R_3$ is a hydrogen atom or a saturated hydrocarbon group having 1 to 20 carbon atoms. That is, alkyl p-phenylene-diamines such as N,N′-dimethyl-p-phenylenediamine, N,N′-diethyl-p-phenylenediamine, N,N′-dipropyl-p-phenylenediamine, N,N′-diisopropyl-p-phenylenediamine, N,N′-di-n-butyl-p-phenylenediamine, N,N′-di-sec-butyl-p-phenylenediamine and N,N′-di-tert-butyl-p-phenylenediamine; and
aromatic group-substituted p-phenylenediamines such as N,N′-diphenyl-p-phenylenediamine, N-phenyl-N′-isopropyl-p-phenylenediamine and N,N′-di-β-naphthyl-p-phenylenediamine are included in the above general formula.

Further, the catechol derivatives in the present invention are represented by the following general formula:

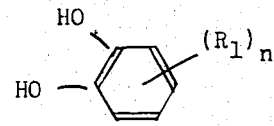

in which $R_1$ is a saturated hydrocarbon group or aromatic hydrocarbon group having 1 to 10 carbon atoms, and n is an integer of 0, 1, 2, 3 or 4. As said catechol derivatives, there are, for example, alkyl catechols such as catechol itself, p-methylcatechol, p-ethylcatechol, p-propylcatechol, p-isopropylcatechol, p-n-butylcatechol, p-sec-butylcatechol, p-tert-amylcatechol and 1,2-dihydroxy-3-tert-butyl-5-methylbenzene; and aromatic group-substituted catechols such as p-phenylcatechol and p-(p-methylphenyl) catechol.

Furthermore, the pyrogallol derivatives in the present invention are represented by the following general formula:

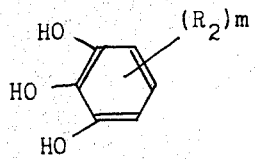

in which $R_2$ is a saturated hydrocarbon group or aromatic hydrocarbon group having 1 to 10 carbon atoms, and m is an integer of 0, 1, 2 or 3. As said pyrogallol derivatives, there are, for example, pyrogallol and 1,2,3-trihydroxy-5-methylbenzene.

Furthermore, the N-nitrosamines in the present invention are represented by the following general formula:

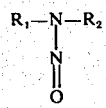

in which $R_1$ and $R_2$ are the same or different alkyl, cycloalkyl, aryl or naphthyl groups each, having 1 to 20 carbon atoms and each having or not having amino and alkoxy groups as substituent groups. As said N-nitrosamines, there are, for example, N-nitroso-dialkylamines such as N-nitroso-dimethylamine, N-nitroso-diethylamine, N-nitroso-di-n-propylamine, N-nitroso-di-n-butylamine, N-nitroso-di-n-pentylamine and N-nitroso-di-n-hexylamine; N-nitroso-cycloalkylamine such as N-nitrosodicyclohexylamine; and other N-nitrosamines such as N-nitrosodiphenylamine, N-nitroso-dicumenylamine, N-nitroso-ditolylamine, N-nitroso-dixylylamine, N-nitroso-methylphenylamine, N-nitroso-ethylphenylamine and N-nitroso-dinaphthylamine.

Still further, the quinoline derivatives in the present invention are represented by the following general formula:

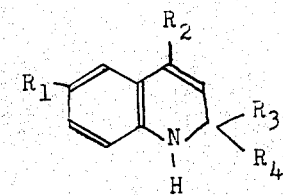

in which $R_1$ is a hydrogen atom or an alkoxy group having 1 to 5 carbon atoms, and $R_2$, $R_3$ and $R_4$ are the same or different alkyl groups each having 1 to 5 carbon atoms. As said quinoline derivatives, there are, for example, 1,2-dihydro-2,2,4-trimethylquinoline, 1,2-dihydro-2,2,4-triethylquinoline, 1,2-dihydro-2,2,4-tri-n-propylquinoline, 1,2-dihydro-2,2,4-tri-n-butylquinoline, 1,2-dihydro-2,2-dimethyl-4-ethylquinoline, 1,2-dihydro-2,2,4-trimethyl-6-methoxyquinoline, 1,2-dihydro-2,2,4-trimethyl-6-propoxyquinoline and 1,2-dihydro-2,2,4-trimethyl-6-n-butoxyquinoline.

Still further, the naphthol derivatives in the present invention are represented by the following general formula:

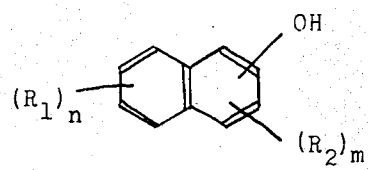

in which $R_1$ and $R_2$ are hydrogen atoms, alkyl groups each having 1 to 20 carbon atoms, nitro groups, hydroxyl groups or amino groups; n is an integer of 1, 2 or 3; m is an integer of 1, 2, 3 or 4; and one of $(R_1)_n$ and $(R_2)_m$ is one or more of nitro, hydroxyl or amino groups. As the above naphthol derivatives, there are, for example, dihydroxynaphthalenes such as 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene and 2,7-dihydroxynaphthalene; aminonaphthols such as 1-amino-2-naphthol, 2-amino-1-naphthol, 4-amino-1-naphthol, 5-amino-1-naphthol, 6-amino-1-naphthol, 7-amino-1-naphthol, 7-amino-2-naphthol, 8-amino-1-naphthol and 8-amino-2-naphthol; and nitro-naphthols such as 1-nitro-2-naphthol, 2-nitro-1-naphthol and 4-nitro-1-naphthol.

As disclosed in the above, one or more compounds selected from the above-mentioned p-phenylenediamine derivatives, catechol derivatives, pyrogallol derivatives, N-nitrosamines, quinoline derivatives and naphthol derivatives are used as the additive in the preparation of the adduct of α,β-ethylenically unsaturated dicarboxylic acid compound and butadiene lower polymer or copolymer, in which the amount of said additive is in the range of 0.005 to 5% by weight, preferably 0.1 to 2.0% by weight to said butadiene lower polymer or copolymer. When the amount of said additive for inhibiting gelation is too small, the viscosity of the obtained adduct is very much increased, and sometimes, the adduct becomes a gel, or the water-solubilizing of the adduct becomes difficult. On the contrary, it is economically disadvantageous to add an excess amount of said additive, and such excess addition sometimes causes adverse effects to the addition reaction. The effect of said additive is not decreased even in the coexistence of other additives such as hydroquinone and 2,6-di-tert-butyl-4-methylphenol which have little gelation inhibiting effect.

The addition reaction of the present invention between a α,β-ethylenically unsaturated dicarboxylic acid compound and a butadiene lower polymer or copolymer in the presence of said additive, may be carried out at a temperature of 120° to 250°C, preferably 150° to 220°C. If the reaction temperature is lower, the reaction period becomes long, and if the reaction temperature is too high, there is the risk of gelation even though the reaction period may be shortened.

In the present invention, the following oil compound can be added to the reaction system of said butadiene lower polymer or copolymer and a α,β-ethylenically unsaturated dicarboxylic acid compound.

As said oil component, (1) animal and vegetable oils having an iodine value of 100 or more such as linseed oil, tung oil, soybean oil, dehydrated castor oil, safflower oil, sardine oil, herring oil and saury oil; (2) unsaturated fatty acids such as linoleic acid, linolenic acid, oleic acid and α-eleostearic acid; (3) modified oils such as boiled oil and stand oil which are prepared by heat treatment of said animal and vegetable oils as shown in the above (1); (4) dimeric acids of the fatty acids as defined in the above (2); and (5) styrenated oil which is prepared by copolymerizing an animal or vegetable oil and styrene, may be exemplified. These oil components may be used with the butadiene lower polymer or copolymer by mixing them together in any ratio, and the above mixture can be partially oxidized by heating at 60° to 200°C with blowing of air in the presence of a conventional drier of a carboxylic acid metal salt such as copper naphthenate or manganese octenoate, or said mixture can be polymerized by heating at a temperature of 50° to 280°C in the presence or absence of an organic peroxide such as dicumyl peroxide or benzoyl peroxide. While, the thus prepared partially oxidized product and polymerized product may also be used in the present invention.

In the present invention, when the viscosity of a butadiene lower polymer or copolymer is high, a diluent may be used so as to reduce the viscosity and to smooth the addition reaction. Such diluent should have a boiling point the same as or lower than the addition reaction temperature, and be inert to the butadiene lower polymer or copolymer, α,β-ethylenically unsaturated dicarboxylic acid compound, p-phenylenediamine derivatives, catechol derivatives, pyrogallol derivatives, N-nitrosamines, quinoline derivatives and naphthol derivatives. For example, petroleum fractions such as toluene, xylene and kerosene may be preferably used as the above-mentioned diluents.

The inert gas for the displacement of the reaction system may be those which are inert to the butadiene lower polymer, α,β-ethylenically unsaturated dicarboxylic acid compound and said additives, for example, argon, nitrogen and carbon dioxide may be preferably used.

The adducts of the present invention which are prepared from a α,β-ethylenically unsaturated dicarboxylic acid compound and a butadiene lower polymer or copolymer in the presence of p-phenylenediamine derivatives, catechol derivatives, pyrogallol derivatives, N-nitrosamines, quinoline derivatives or naphthol derivatives, are almost colorless or light brown liquids or semisolids at room temperature, and each having a number average molecular weight of 200 to 10,000. Through the process of the present invention, the molecular weight of butadiene lower polymer or copolymer is increased by the addition of the α,β-ethylenically unsaturated dicarboxylic acid compound, and the viscosity thereof is somewhat increased, while the iodine value is decreased to some extent. Further, with the above changes, the adduct acquires an acid value and a saponification value.

Thus adduct of the present invention can be used as a film forming material and a curable material for water paint, electrodeposition coating material, emulsion paint and so forth, which depends upon the rate of addition of a α,β-ethylenically unsaturated dicarboxylic acid compound to a butadiene lower polymer or copolymer, and upon the kind of secondary chemical treatment.

The present invention will be more clearly understood with reference to the following Examples.

EXAMPLE 1

Eight hundred parts by weight of liquid polybutadiene (1,2-double bond: 83%, trans-1,4-double bond: 17%) with a number average molecular weight of 800 and a viscosity of 13 poise (25°C), 800 parts by weight of xylene, 130 parts by weight of maleic anhydride and 2.4 to 4.0 parts by weight of several additives were fed into a 2 liter stainless steel-made autoclave with a magnetic stirrer. The air in the reaction system was sufficiently displaced by dried nitrogen gas, and the autoclave was put into an oil bath at 210°C. The reaction mixture was sufficiently stirred, and the heating was continued for 8 hours after the reaction mixture became 200°C to cause the adition reaction between said liquid polybutadiene and maleic anhydride. After the reaction, the autoclave was cooled to room temperature, and opened to take out the reaction mixture. Then it was treated in a reduced pressure of 1 mmHg at 150°C to distill off the solvent of xylene and a small amount of remaining maleic anhydride, thereby a light colored adduct of the present invention was obtained. The properties of the adducts in the above are shown in the following Table 1.

Table 1

| Additives Structural Formula | Amount of* Addition (wt.parts) | Viscosity (poise/25°C) | Gardner Color number | Acid** Value |
|---|---|---|---|---|
| ⌬−NH−⌬−NH−CH(CH$_3$)$_2$ | 0.3 | 3,600 | 9 | 82 |
| ⌬(OH)$_2$ (catechol) | 0.3 | 3,500 | 8 | 82 |
| ⌬(OH)$_3$ (pyrogallol) | 0.3 | 3,500 | 5 | 82 |
| (CH$_3$)$_2$N−N=O | 0.5 | 3,300 | 13 | 82 |

Table 1-continued

| Additives Structural Formula | Amount of* Addition (wt.parts) | Properties of Adducts Viscosity (poise/25°C) | Gardner Color number | Acid** Value |
|---|---|---|---|---|
| 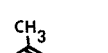 | 0.4 | 4,500 | 12 | 81 |
|  | 0.5 | 2,500 | 7 | 82 |

Notes:
*Parts by weight against 100 parts by weight of butadiene lower polymer.
**Measured by using ethanol solution of KOH. Comparative Example 1

An addition reaction was carried out in the same manner as the foregoing Example 1 without using said additives. One hour after the reaction mixture became 200°C, the electromagnetic stirrer was stopped, so that the autoclave was cooled and then opened. It was found that gelation of the reaction mixture had occurred.

From the results of Example 1 and Comparative Example 1, it was understood that the additions of several additives in Example 1 were markedly effective for the prevention of gelation in the addition reaction of the butadiene polymer and maleic anhydride.

EXAMPLES 2 TO 15, AND COMPARATIVE EXAMPLES 2 TO 14

Two hundred parts by weight of liquid polybutadiene (1,2-double bond: 84%, trans-1,4-double bond: 16%) with a number average molecular weight of 1,020 and a viscosity of 42 poise (25°C), 200 parts by weight of xylene, 20 parts by weight of maleic anhydride and 0.2 to 1.6 parts by weight of several additives were fed into a 500 ml stainless steel-made autoclave with a magnetic stirrer, and the addition reaction was carried out in the same manner as Example 1 at 200°C for 5 hours. Thus, the effects of gelation inhibitions of several additives were tested, the results of which are shown in the following Table 2.

Table 2 (a)

| Example | Additives Structural Formula | Amount of Addition (wt.parts) | Reaction Period (hour) | Viscosity (poise/25°C) | Gardner Color number | Acid Value |
|---|---|---|---|---|---|---|
| Example 2 |  | 0.15 | 5 | 960 | 9 | 48 |
| Example 3 |  | 0.2 | 5 | 660 | 15 | 54 |
| Example 4 |  | 0.8 | 5 | 3,000 | 15 | 52 |
| Comparative Example 2 |  | 0.2 | 5 Gelation | — | — | — |
| Example 3 |  | 0.3 | 5 Gelation | — | — | — |
| Example 5 | 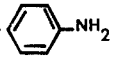 | 0.2 | 5 | 5,000 | 3 | 53 |

Table 2 (b)

| Example | Additives Structural Formula | Amount of Addition (wt. parts) | Reaction Period (hour) | Viscosity (poise/25°C) | Gardner Color Number | Acid Value |
|---|---|---|---|---|---|---|
| Example 6 | 4-tert-butylcatechol | 0.2 | 5 | 290 | 3 | 49 |
| Example 7 | pyrogallol (1,2,3-trihydroxybenzene) | 0.2 | 5 | 1,700 | 5 | 48 |
| Comparative Example 4 | resorcinol (1,3-dihydroxybenzene) | 0.2 | 5 Gelation | — | — | — |
| Example 5 | hydroquinone (1,4-dihydroxybenzene) | 0.2 | 5 Gelation | — | — | — |
| Example 8 | $CH_3-N(CH_2-CH_3)-N=O$ | 0.3 | 5 | 4,500 | 13 | 52 |
| Example 9 | N,N-diphenyl-N-nitrosamine | 0.3 | 5 | 3,500 | 13 | 48 |

Table 2 (c)

| Example | Additives Structural Formula | Amount of Addition (wt.parts) | Reaction Period (hour) | Viscosity (poise/25°C) | Gardner Color number | Acid Value |
|---|---|---|---|---|---|---|
| Comparative Example 6 | phenyl-NH-phenyl-NO | 0.3 | 5 Gelation | — | — | — |
| Example 10 | 2,2,4-trimethyl-1,2-dihydroquinoline | 0.4 | 5 | 3,000 | 13 | 53 |
| Example 11 | 6-ethoxy-2,2,4-trimethyl-1,2-dihydroquinoline | 0.4 | 5 | 2,500 | 9 | 49 |
| Comparative Example 7 | 2,4-dimethylquinoline | 0.4 | 5 Gelation | — | — | — |
| Example 8 | quinoline | 0.4 | 5 Gelation | — | — | — |

Table 2 (d)

| Example | Additives Structural Formula | Amount of Addition (wt.parts) | Reaction Period (hour) | Viscosity (poise/25°C) | Gardner Color number | Acid Value |
|---|---|---|---|---|---|---|
| Example 12 | 1,4-dihydroxynaphthalene | 0.3 | 5 | 400 | 16 | 49 |
| Example 13 | 1,5-dihydroxynaphthalene | 0.3 | 5 | 1,000 | 8 | 48 |
| Example 14 | 1-hydroxy-2-aminonaphthalene | 0.3 | 5 | 7,000 | 13 | 45 |
| Example 15 | 1-nitro-2-hydroxynaphthalene | 0.3 | 5 | 900 | 12 | 47 |
| Comparative Example 9 | 1-naphthol | 0.3 | 5 Gelation | — | — | — |

Table 2 (e)

| Example | Additives Structural Formula | Amount of Addition (wt. parts) | Reaction Period (hour) | Viscosity (poise/25°C) | Gardner Color number | Acid Value |
|---|---|---|---|---|---|---|
| Comparative Example 10 | 1-aminonaphthalene | 0.3 | 5 Gelation | | | |
| Example 11 | 1-nitronaphthalene | 0.3 | 5 Gelation | — | — | — |
| Example 12 | 2,6-di-tert-butyl-4-methylphenol (bis-tert-butyl phenol) | 0.6 | 5 Gelation | 30,000 | — | 48 |
| Example 13 | bis-phenol sulfide derivative | 0.2 | 7 | More than 120,000 | 5 | 51 |

Table 2 (f)

| Example | Additives | | Reaction Period (hour) | Properties of Adducts | | |
|---|---|---|---|---|---|---|
| | Structural Formula | Amount of Addition (wt.parts) | | Viscosity (poise/25°C) | Gardner Color number | Acid Value |
| Comparative Example 14 | Copper naphthenate | 0.2 | 5 | More than 120,000 | More than 18 | 51 |

It will be understood from Table 2 that various additives of the present invention are very effective, and the adducts have fluidity at room temperature. While in case the conventional additives such as hydroquinone, 2,6-di-tert-butyl-4-methylphenol and copper naphthenate are used, the adducts are very high in their viscosities, or they become gels. Thus the effect of such additives is far inferior to the additives of the present invention.

EXAMPLES 16 AND 17

By using butadiene lower polymer B-1000 (trademark of Nippon Soda Co., Ltd.); number average molecular weight; 1,100; viscosity: 65 poise at 25°C; 1,2-double bond: 95%; and 1,4-double bond: 5%), addition of maleic anhydride was carried out with the same composition as Example 1 in the presence or absence of several additives. When the additive is not used, the reaction product became a gel and the viscosity could not be measured. In the meantime, when the gelation inhibitors were used, gels are not formed and gave the viscosities as shwon in the following Table 3.

EXAMPLES 18 and 19

Four hundred parts by weight of butadiene lower polymer POLYOIL 110 (trademark of Chemische Werke Hüls A. G., Marl; number average molecular weight: 1,750; viscosity: 6.0 poise at 25°C: cis-1,4-double bond: 86%; trans-1,4-double bond: 14%), 400 parts by weight of xylene and 80 parts by weight of maleic anhydride were caused to react in like manner as the foregoing Example 1 in the presence or absence of several additives as gelation inhibitors. When the gelation inhibitor is not used, the viscosity of the resulting adduct was 15,360 poise (25°C) however, through the use of only 0.2 to 0.3 parts by weight of gelation inhibitors against 100 parts by weight of said butadiene lower polymer, the viscosities of the adducts were decreased very much as shown in the following Table 4.

Therefore, it is understood that the effect of the additives for reducing the viscosity of the adduct is excellent.

Table 3

| | Gelation Inhibitors | Viscosity of Adduct (poise/25°C) |
|---|---|---|
| Example 16 | 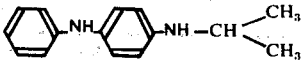 | 5,000 |
| Example 17 | 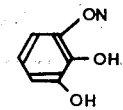 | 6,500 |

Table 4

| | Additives | | Viscosity of Adduct (poise/25°C) |
|---|---|---|---|
| | Structural Formula | Amount of addition (wt. parts) | |
| Example 18 | 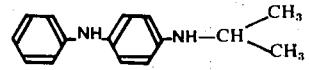 | 0.2 | 5,680 |
| Example 19 | 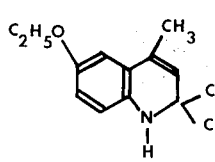 | 0.3 | 7,300 |

EXAMPLES 20 and 21

Four hundred parts by weight of butadiene lower polymer (number average molecular weight: 3,700; viscosity: 1,440 poise at 25°C; 1,2-double bond: 91%; 1,4-double bond: 9%), 400 parts by weight of xylene and 40 parts by weight of maleic anhydride were caused to react in like manner as Example 1 in the presence or absence of additives. When the additive is not used, gelation of reaction mixture was caused one hour after the reaction mixture reached a certain temperature. While, in case the additives were used, the adducts having the viscosities as shown in the following Table 5 were obtained. Therefore, it is understood that the butadiene polymer having a relatively higher molecular weight can be also reacted with maleic anhydride without gelation, which has been impossible in the prior art.

Table 5

| Additives | Viscosity of Adduct (poise/25°C) |
|---|---|
| Example 20 (H₃C-C(CH₃)₂- substituted catechol structure) | 25,000 |
| Example 21 (1,5-dihydroxynaphthalene) | 35,000 |

EXAMPLES 22 AND 23

Four hundred parts by weight of butadiene lower polymer (molecular weight: 1,100; viscosity: 80 poise at 25°C; 1,2-double bond: 85%; trans-double bond: 15%; styrene content: 10%), 400 parts by weight of xylene, 40 parts by weight of maleic anhydride, 1.0 parts by weight of additive A and 0.2 part by weight of additive B were fed into a 2 liter stainless steel-made autoclave, and the reaction was carried out in like manner as Example 1. After the addition reaction for 8 hours at 210°C, the solvent and a small amount of unreacted maleic anhydride were distilled off in a reduced pressure, thus each adduct was obtained. The properties of the adducts are shown in the following Table 6.

In the meantime, in order to compare the results, the above reaction was carried out without using the additives, where gelation was caused to occur within 5 hours.

Table 6

| | Additives | | Properties of Adduct | |
|---|---|---|---|---|
| | Additive A | Additive B | Viscosity (poise/25°C) | Gardner color number |
| Example 22 | pyrogallol (1,2,3-trihydroxybenzene) | catechol derivative | 18,000 | 6 |
| Example 23 | 1,3-dihydroxynaphthalene (tetrahydro) | 4-nitro-1-hydroxynaphthalene (tetrahydro) | 20,000 | 13 |

EXAMPLES 24 AND 25

A linseed oil modified butadiene lower polymer (A) with a viscosity of 20 poise (25°C) was prepared from 800 parts by weight of butadiene lower polymer (number average molecular weight: 2,000; viscosity: 150 poise at 25°C) and 200 parts by weight of linseed oil by thermal polymerization thereof at 250°C for 3 hours in an atmosphere of dried nitrogen gas. 1000 parts by weight of the above linseed oil modified butadiene lower polymer (A), 110 parts by weight of xylene, 220 parts by weight of maleic anhydride and 7 parts by weight of additive were fed into a 2 liter stainless steel-made autoclave, and the reaction was carried out in like manner as Example 1. After the addition reaction of 2.5 hours at 205°C, the solvent and a small amount of unreacted maleic anhydride were removed in a reduced pressure to obtain the adduct. The properties of thus prepared adducts are shown in Table 7.

In the meantime, the above process was carried out without using the additive for comparison, as the result, gelation was caused to occur within 2 hours.

Table 7

| Additives | | Properties of Adduct | | |
|---|---|---|---|---|
| | | Viscosity (poise/25°C) | Gardner color number | Acid Value |
| Example 24 | [naphthalene-1,3-diol structure] | 20,000 | 13 | 100 |
| Example 25 | [CH₃—N(C₆H₅)—N=O structure] | 35,000 | 14 | 100 |

From the above examples, it will be understood that the method of the present invention is excellent. It should be emphasized, however, that the specific examples described herein are intended as merely illustrative and in no way restrictive of the invention.

What is claimed is:

1. In a method for preparing an adduct of (A) a butadiene lower polymer, or a butadiene lower copolymer of butadiene and a monomer selected from the group consisting of a conjugated diolefin and a vinyl substituted aromatic compound, and (B) a α,β-ethylenically unsaturated dicarboxylic acid compound selected from the group consisting of maleic anhydride, citraconic anhydride, 1,2-diethylmaleic anhydride, maleic acid monomethyl ester, maleic acid dimethyl ester and maleic acid diethyl ester, said method is characterized in that said (A) and (B) are reacted at a temperature of from 120°C to 250°C in the presence of an inert gas and from 0.005 to 5 percent by weight, based upon the weight of (A), of a compound selected from (C) the group consisting of a p-phenylenediamine a pyrogallol, a N-nitrosoamine, a quinoline and a naphthol, said p-phenylenediamine being selected from the group consisting of
N,N'-dimethyl-p-phenylenediamine,
N,N'-diethyl-p-phenylenediamine,
N,N'-dipropyl-p-phenylenediamine,
N,N'-diisopropyl-p-phenylenediamine,
N,N'-di-n-butyl-p-phenylenediamine,
N,N'-di-sec-butyl-p-phenylenediamine,
N,N'-di-tert-butyl-p-phenylenediamine,
N,N'-diphenyl-p-phenylenediamine,
N-phenyl-N'-isopropyl-p-phenylenediamine and
N,N'-di-β-naphthyl-p-phenylenediamine;
said pyrogallol is pyrogallol or 1,2,3-trihydroxy-5-methylbenzene;
said N-nitrosoamine being selected from the group consisting of N-nitroso-dimethylamine, N-nitroso-diethylamine, N-nitroso-di-n-propylamine, N-nitroso-di-n-butylamine, N-nitroso-di-n-pentylamine, N-nitroso-di-n-hexylamine, N-nitroso-dicyclohexylamine, N-nitroso-diphenylamine, N-nitroso-dicumenylamine, N-nitroso-ditolylamine, N-nitroso-dixylylamine, N-nitroso-methylphenylamine, N-nitroso-ethylphenylamine and N-nitroso-dinaphthylamine;
said quinoline being selected from the group consisting of
1,2-dihydro-2,2,4-trimethylquinoline,
1,2-dihydro-2,2,4-triethylquinoline,
1,2-dihydro-2,2,4-tri-n-propylquinoline,
1,2-dihydro-2,2,4-tri-n-butylquinoline,
1,2-dihydro-2,2-dimethyl-4-ethylquinoline,
1,2-dihydro-2,2,4-trimethyl-6-methoxyquinoline,
1,2-dihydro-2,2,4-trimethyl-6-propoxyquinoline and
1,2-dihydro-2,2,4-trimethyl-6-n-butoxyquinoline;
and
said naphthol being selected from the group consisting of
1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, 1-amino-2-naphthol, 2-amino-1-naphthol, 4-amino-1-naphthol, 5-amino-1-naphthol, 6-amino-1-naphthol, 7-amino-1-naphthol, 7-amino-2-naphthol, 8-amino-1-naphthol, 8-amino-2-naphthol, 1-nitro-2-naphthol, 2-nitro-1-naphthol and 4-nitro-1-naphthol.

2. The method of claim 1, in which the amount of (C) is from 0.1 to 2.0% by weight of said (A).

3. The method of claim 1, in which the reaction mixture of said addition reaction is heated to a temperature of from 150° to 220°C.

4. The method of claim 1, in which said reaction is carried out in the presence of an animal or vegetable oil having an iodine value of 100 or more, unsaturated fatty acid or modified oil.

5. The method of claim 1, wherein (A) is a butadiene lower polymer.

6. The method of claim 1, wherein (B) is maleic anhydride.

* * * * *

UNITED STATES PATENT AND TRADEMARK OFFICE
CERTIFICATE OF CORRECTION

PATENT NO. : 3,952,023
DATED : April 20, 1976
INVENTOR(S) : ATSUSHI KAIYA et al

It is certified that error appears in the above-identified patent and that said Letters Patent are hereby corrected as shown below:

Column 2, line 50: replace "cathechol" with
--- catechol ---.

Column 9, under "Notes", after "**": delete "Comparative Example 1";
in regular type, insert --- Comparative Example 1 --- as the heading of the following paragraph.

Column 13, Table 2(e), Example 12: replace the formula with

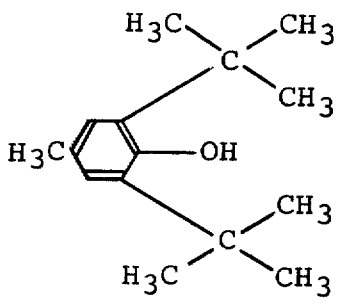

Column 15, line 32: replace "shwon" with --- shown ---.

Signed and Sealed this

Seventh Day of September 1976

[SEAL]

Attest:

RUTH C. MASON
Attesting Officer

C. MARSHALL DANN
Commissioner of Patents and Trademarks